(12) United States Patent
Sung et al.

(10) Patent No.: US 6,226,684 B1
(45) Date of Patent: May 1, 2001

(54) METHOD AND APPARATUS FOR REESTABLISHING NETWORK CONNECTIONS IN A MULTI-ROUTER NETWORK

(75) Inventors: Yi-Hsin Sung, Sunnyvale; Vibha Dayal, Saratoga; Satish Ramakrishnan, San Jose, all of CA (US)

(73) Assignee: Pointcast, Inc., Sunnyvale, CA (US)

( * ) Notice: Subject to any disclaimer, the term of this patent is extended or adjusted under 35 U.S.C. 154(b) by 0 days.

(21) Appl. No.: 09/178,051

(22) Filed: Oct. 26, 1998

(51) Int. Cl.[7] ................................................. G06F 15/173
(52) U.S. Cl. ......................... 709/238; 709/224; 709/226; 709/229; 709/203
(58) Field of Search ...................... 709/238, 239, 709/240, 241, 242, 243, 244, 245, 249, 219, 217, 232, 235, 203, 224, 226, 229; 370/351, 401, 409, 911

(56) References Cited

U.S. PATENT DOCUMENTS

| | | | |
|---|---|---|---|
| 5,881,238 * | 3/1999 | Aman et al. ........................ | 709/226 |
| 5,922,049 * | 7/1999 | Radia et al. ........................ | 709/220 |
| 5,951,694 * | 9/1999 | Choquier et al. .................... | 714/15 |
| 6,011,782 * | 1/2000 | DeSimone et al. .................. | 370/260 |
| 6,052,718 * | 4/2000 | Gifford .............................. | 709/219 |
| 6,052,725 * | 4/2000 | McCann et al. .................... | 709/223 |
| 6,061,349 * | 5/2000 | Gile et al. ........................... | 370/389 |
| 6,070,191 * | 5/2000 | Narendran et al. .................. | 709/226 |
| 6,078,954 * | 6/2000 | Lakey et al. ........................ | 709/223 |

* cited by examiner

Primary Examiner—Mehmet B. Geckil
(74) Attorney, Agent, or Firm—Blakely, SokoLoff, Taylor & Zafman

(57) ABSTRACT

A method and an apparatus for routing network messages from a client to a server bypassing a router which requires that the router, in one embodiment, maintain a table to record where the client's communications were redirected in previous communications. This allows the router to reestablish an identical connection the next time the client needs to communicate with a server. Further, the router transmits a multicast message containing the redirection information to the other routers in the system allowing the other routers in the system to reestablish the same client-server connection.

34 Claims, 16 Drawing Sheets

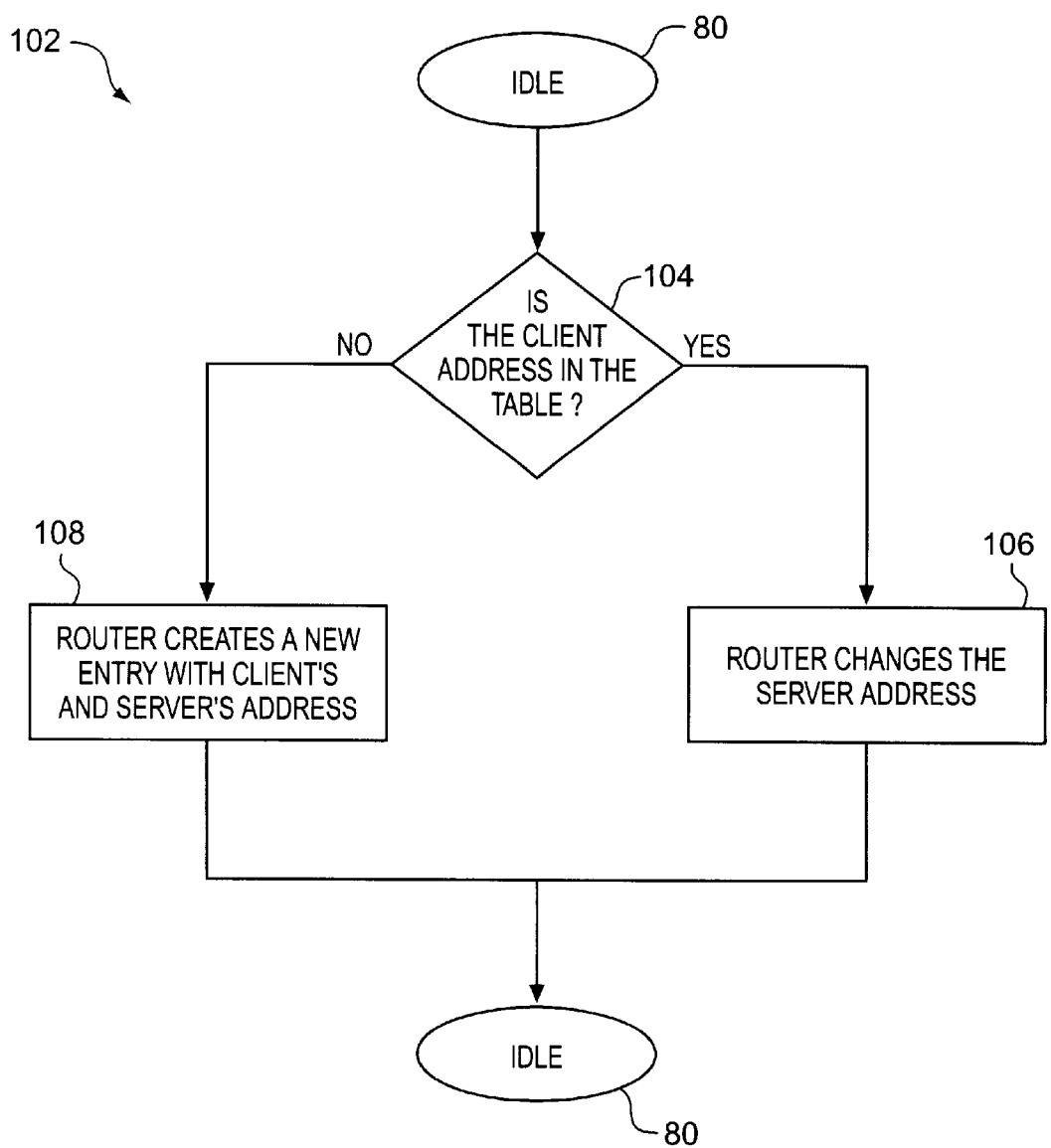

| CLIENT'S IP ADDRESS | SERVER IP ADDRESS |
|---|---|
| CLIENT IP #1 | SERVER 1 |
| CLIENT IP #2 | SERVER 2 |
| CLIENT IP #3 | SERVER 3 |
| . . . | . . . |
| CLIENT IP #N | SERVER 1 |

*FIG. 6*

| SERVER | PORT : | CURRENT PRIORITY | CPU RATING | CURRENT LOAD | TIME OF LAST COM. |
|---|---|---|---|---|---|
| SERVER IP #1 | PORT FOR SERVER #1 | PRIORITY OF SERVER 1 | RATING OF SERVER 1 | LOAD ON SERVER 1 | TIME |
| SERVER IP #1 | PORT FOR SERVER #2 | PRIORITY OF SERVER 2 | RATING OF SERVER 2 | LOAD ON SERVER 2 | TIME |
| SERVER IP #1 | PORT FOR SERVER #3 | PRIORITY OF SERVER 3 | RATING OF SERVER 3 | LOAD ON SERVER 3 | TIME |
| ... | ... | ... | ... | ... | ... |
| SERVER IP #1 | PORT FOR SERVER #N | PRIORITY OF SERVER N | RATING OF SERVER N | LOAD ON SERVER N | TIME |

FIG. 7

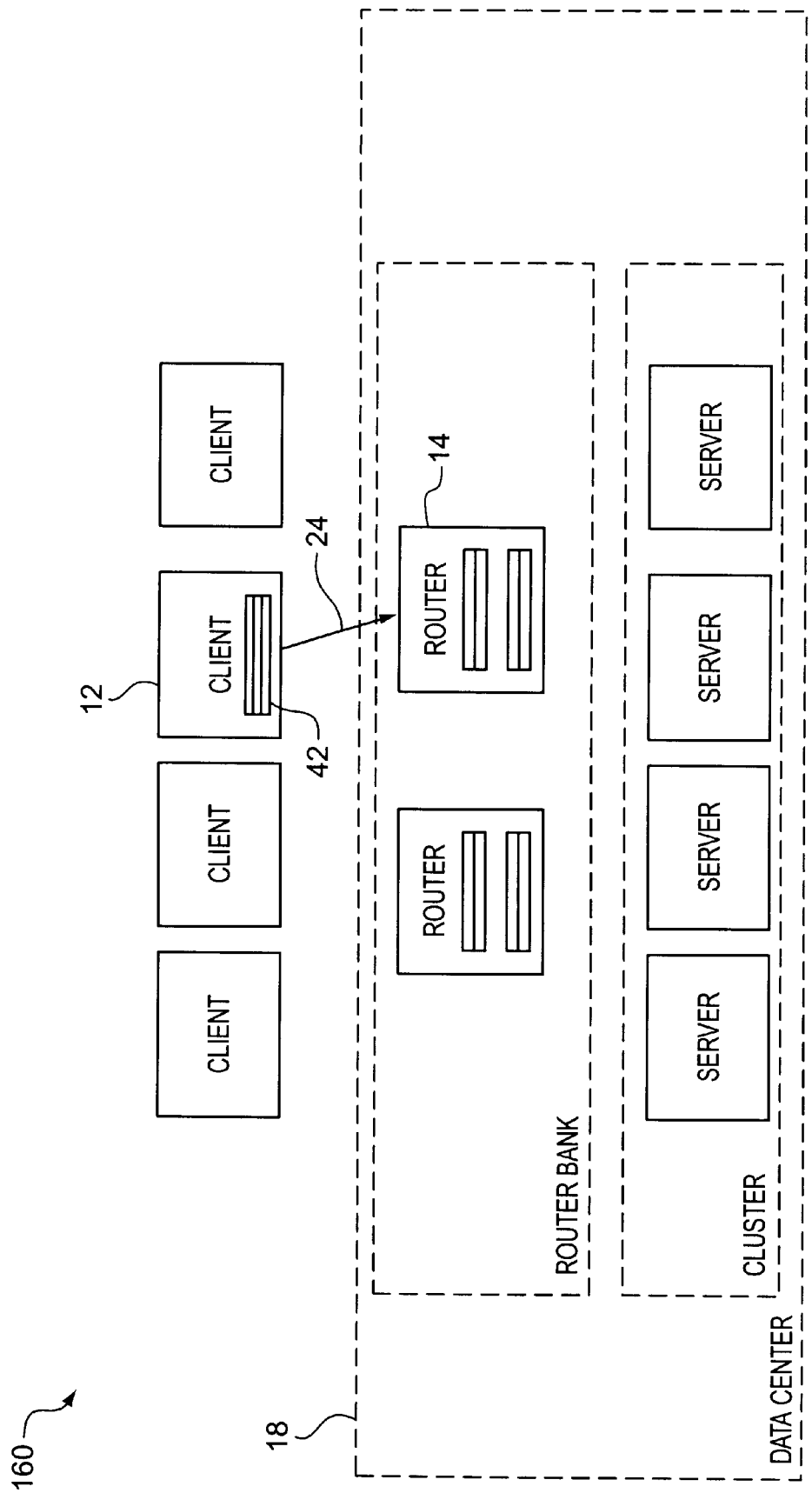

A POINTCAST HTTP REQUEST

GET /FIDO-1/ NumItm-1/ NumRef-1/1310993-1?usa::storx HTTP/1.0

A POINTCAST HTTP ROUTER RESPONSE (REDIRECTION):

IP ADDRESS AND PORT OF SERVER

ORIGINAL REQUEST:
* APPLICATION ID
* NUMBER OF ITEMS (NUMITEMS)
* NUMBER OF REFERENCES (NUMREF)
* CONTENT GROUP IDENTIFIER
* SEARCH ARGUMENT

A POINTCAST HTTP ROUTER RESPONSE (NO SERVERS):

NO SERVER AVAILABLE

*FIG. 10B*

METHOD AND APPARATUS FOR REESTABLISHING NETWORK CONNECTIONS IN A MULTI-ROUTER NETWORK

FIELD OF THE INVENTION

The present invention relates generally to the field of networking and, more specifically, to the routing of network messages. More particularly, the present invention relates to a method of recording connections between a client and a server to allow for a set of routers to reestablish these connections the next time a communication is initiated by the client.

BACKGROUND OF THE INVENTION

The routing of network messages from a client to a bank of servers via a router can be a haphazard process. Depending on the router's fairness algorithm a message could get forwarded to a different server each time a connection with the bank of servers is requested by a client. A connection between a particular client and a particular server is repeatable. However, often a client only knows of a group of servers it needs to communicate with. As the amount of data that servers have to provide increases, having a group of servers providing that data is becoming more common.

A particular client will often communicate with the bank of servers repeatedly looking for related data on subsequent connections to the bank of servers. For example, a client may look for data that relates to an executable that it is running or a database that the client is accessing. It would be advantageous for a bank of servers to direct a particular client to a particular server each time a connection to the bank of servers is established. Having a repeatable connection would decrease the number of page faults and reduce the latency incurred in a data request. Further, a repeatable connection increases the caching efficiency on remote proxy servers. Proxy servers will cache the same document or file retrieval from different servers having different Uniform Resource Locations (URLs), and it is thus advantageous to have the same file retrieval from the same server via a single proxy server.

Currently a router will accept messages from a client, and route those messages from the client to a server in a bank of servers according to its particular fairness algorithm. Choosing a server in this manner may result in different servers being contacted each time the client makes a request for information from the bank of servers. This may cause the servers to page fault unnecessarily and may increase the latency involved in a transaction.

SUMMARY OF THE INVENTION

According to a first aspect of the present invention, there is provided a method of establishing a communication link between a client and a first server of a plurality of servers. The client is assigned to the first server of the plurality of servers in response to a transmission received, from the client, at a first router of a plurality of routers. Information is then transmitted to a second router of the plurality of routers. This information indicates the assignment of the client to the first server of the plurality of servers.

In one embodiment, the information indicating the assignment of the client to the first server is recorded in a mapping table. The mapping table may map an address of the client to an address of the first server. The address of the first server may be determined from an entry in the mapping table if the address of the client appears in the mapping table. Alternatively, the address of the first server may be determined utilizing a routing table if the address of the client does not appear in the mapping table.

In an exemplary embodiment, the routing table may be constructed utilizing communications received from any one of the plurality of servers. Further, the mapping table may be constructed utilizing communications received from any one of the plurality of routers.

Information indicating the assignment of the client to the first server may be multi-cast, or alternatively broadcast, from the router to each of the plurality of routers. The router or first server may also transmit a message to the client indicating the assignment of the client to the first server.

In one embodiment, the router may determine whether the first server is accepting communications prior to assigning the client to the first server. This may be done, for example, by the examination of a status indication for the first server maintained in the routing table. The status indication of the first server in the routing table may be modified to indicate the first server as not receiving indications if the first server does not updated the relevant entry within the routing table within a predetermined time.

According to a further aspect of the present invention, there is provided a router that may be configured to perform anyone, or all, of the above steps.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 5B is a flowchart illustrating a methodology, according to one exemplary embodiment of the present invention, used by a router when it receives a message from another router in a data center.

FIG. 6 illustrates a table, according to one exemplary embodiment of the present invention, which is used by a router to implement the sticky IP in the routers.

FIG. 7 shows a table, according to one exemplary embodiment of the present invention, which is used by a router to redirect client communications to servers in a data center.

FIG. 8A shows a block diagram of a network, according to one exemplary embodiment of the present invention, illustrating the initial redirection request from a client to a router.

FIG. 8B shows the format for a client's data request, according to one exemplary embodiment of the present invention.

FIG. 10B shows the format for a router's response to the client's redirection request, according to one exemplary embodiment of the present invention.

DETAILED DESCRIPTION

A method for reestablishing connections between a particular client and a particular server by multiple routers is described. In the following description, for purposes of explanation, numerous specific details are set forth in order to provide a thorough understanding of the present invention. It will be evident, however, to one skilled in the art that the present invention may be practiced without these specific details.

Figure 1:
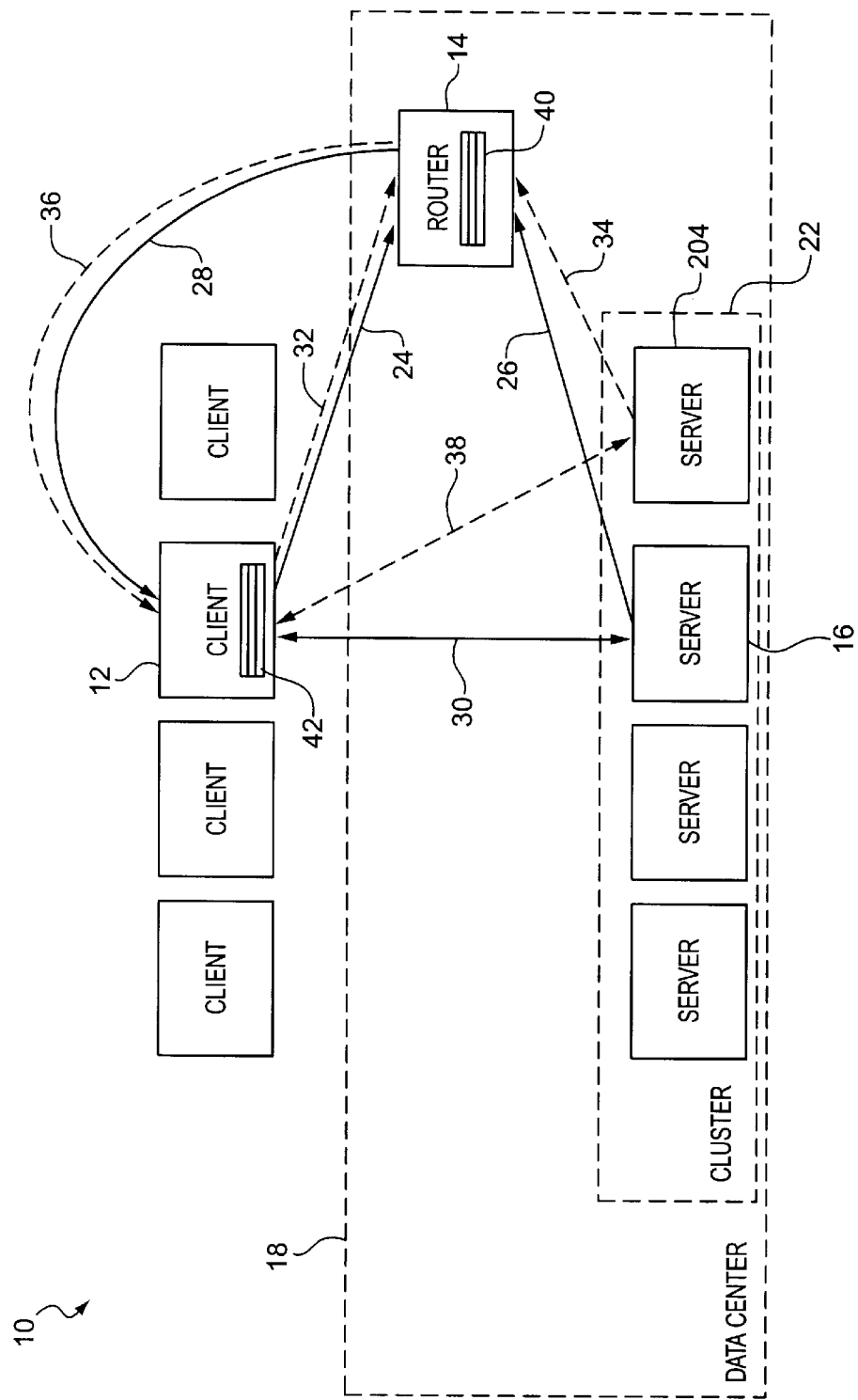
FIG. 1 is a block diagram illustrating the interactions between devices in a network which does not utilize a so-called "sticky" Internet Protocol (sticky IP) or router synchronizing.

FIG. 1 depicts a network 10 in which a client 12 may be redirected to different servers on successive communications to a data center 18. Here, the client 12 needs to establish communication with a server, within a cluster 22, to acquire necessary information. The client 12 begins establishing the connection by sending a message 24 to a router 14. The client 12 generates the IP address for the router 14 from a router IP address table 42 maintained by the client 12. A Domain Name Service (DNS) address may be utilized instead of an IP address to identify a router. However, the use of an address may avoid delays associated with DNS name lookups. The router 14 receives the message 24 and realizes that it cannot handle the request. The router 14 must now redirect communications from the client 12 to a server. To accomplish this, the router 14 looks through a routing table 40, resident on the router 14, and ascertains that a server 16 is the next server slated to receive a client request. The router 14 then redirects the client 12 to the server 16 through a redirect communication 28. After the client 12 is redirected to the server 16 communication will continue between the two network devices, bypassing the router 14, for a period of time.

Eventually the connection between the client 12 and the server 16 will be disrupted and the client 12 will need to reestablish communication with a server within the cluster 22 to acquire additional information. The client 12 contacts the router 14 with a communication 32. The router 14 realizes it cannot handle the request and it must redirect the client 12 to a server. No record of which server the client 12 communicated with during its prior connection exists. The router 14 looks to its routing table 40 and redirects the client 12 to the next server in the routing table 40 slated to receive a client request according to an arbitration or "fairness" algorithm. A server 204 may, for example, be assigned to the client 12 causing the client 12 to begin requesting data from the server 204 after the redirect communication 36 is received. At that time the server 204 needs to cache in the information that the client 12 requests. This caching is resource intensive and may be unnecessary because the server 16, that the client 12 communicated with previously, may already have the necessary information cached in its memory from its prior communications with the client 12.

The so-called "sticky" Internet Protocol (sticky IP) may be implemented to increase efficiency within the afore-described network 10. Specifically, a router implementing sticky IP maintains a mapping table (or so termed a "sticky IP" table) 50 that informs the router as to which server a client last communicated. This allows the servers in a cluster to reduce page faults and increase performance. However, this only helps if the client communicates with the same router each time it attempts to establish a connection. If more than one router is present in a data center the client may communicate with different routers during subsequent communications.

Figure 2:
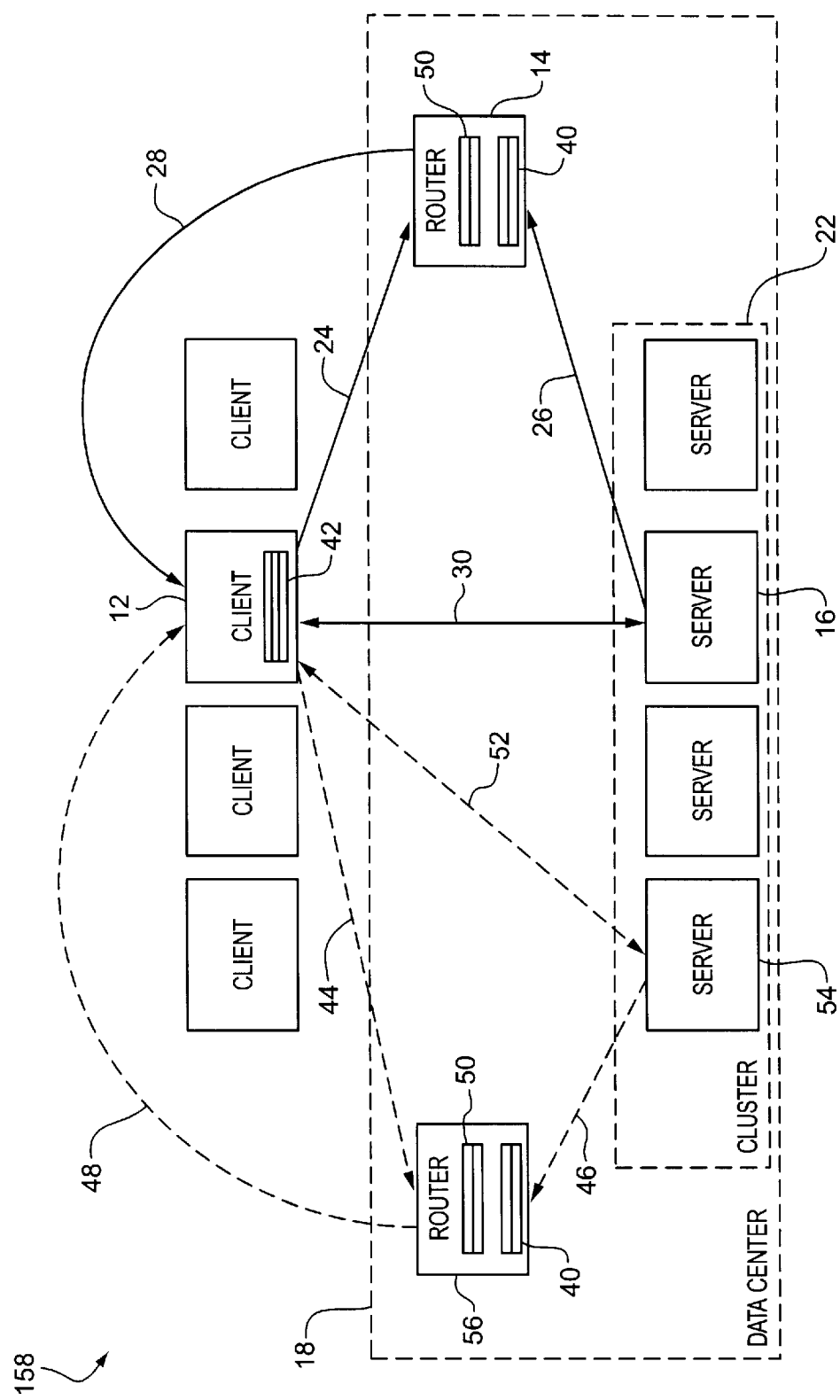
FIG. 2 is a block diagram illustrating the interactions between devices in a network which uses the sticky IP, but not router synching.

Turning to FIG. 2, a network 158 with multiple routers utilizing sticky IP is shown. In this situation a router will know which server a client communicated with previously if the client communicated with the router specifically but not if the client communicated with another router in the data center 18.

In the illustrated network 158, the client 12 needs to establish a first communication with a server. To do this the client 12 sends the message 24 to the router 14. The router 14 realizes it cannot handle the request and it knows to redirect the client 12 to a server. The router 14 looks up the client's IP address in a sticky IP cache table 50 but finds no entry. The router 14 then consults the routing table 40 to find the next server that is slated to receive a client communication. The router 14 redirects the client 12 with the redirect communication 28 to communicate with the server 16. After the client 12 has been redirected the router 14 records both the client's IP address and the server's IP address in an entry in the sticky IP cache table 50 resident on the router 14. The client 12 and the server 16 continue communication for a period of time.

Eventually the client 12 and the server 16 will lose communication and will have to establish a new, second connection with the data center 18 to get additional information. The client 12 begins this process by sending a redirection request to the next router within a bank of routers 20 listed on the router IP address table 42. The client 12 sends a message 44, for example, to a router 56. The router 56 looks at the message 44 and realizes it cannot handle the request. The router 56 looks up the address of the client 12 in its sticky IP cache table 50, but finds no entry for the client 12, as only the router 14 has stored that information. The router 56 selects a server from the cluster 22 by looking at its routing table 40. The router 56 chooses a server 54, for example, ascertains whether it is accepting communications, and then redirects the client 12 to the server 54. The router 56 records a new entry in its sticky IP cache table 50 and then waits for the next message to arrive. The client 12 has thus communicated with two different servers in successive communications with the data center 18, which is undesirable for the reasons stated above.

The present invention proposes a method whereby multiple routers share information about the contacts that they receive from a variety of clients. This can be accomplished, for example, by having each router within a collection of routers multicast new and updated table entries to other routers in the collection to bring all the sticky IP cache tables into synchronization with each other.

Figure 3:
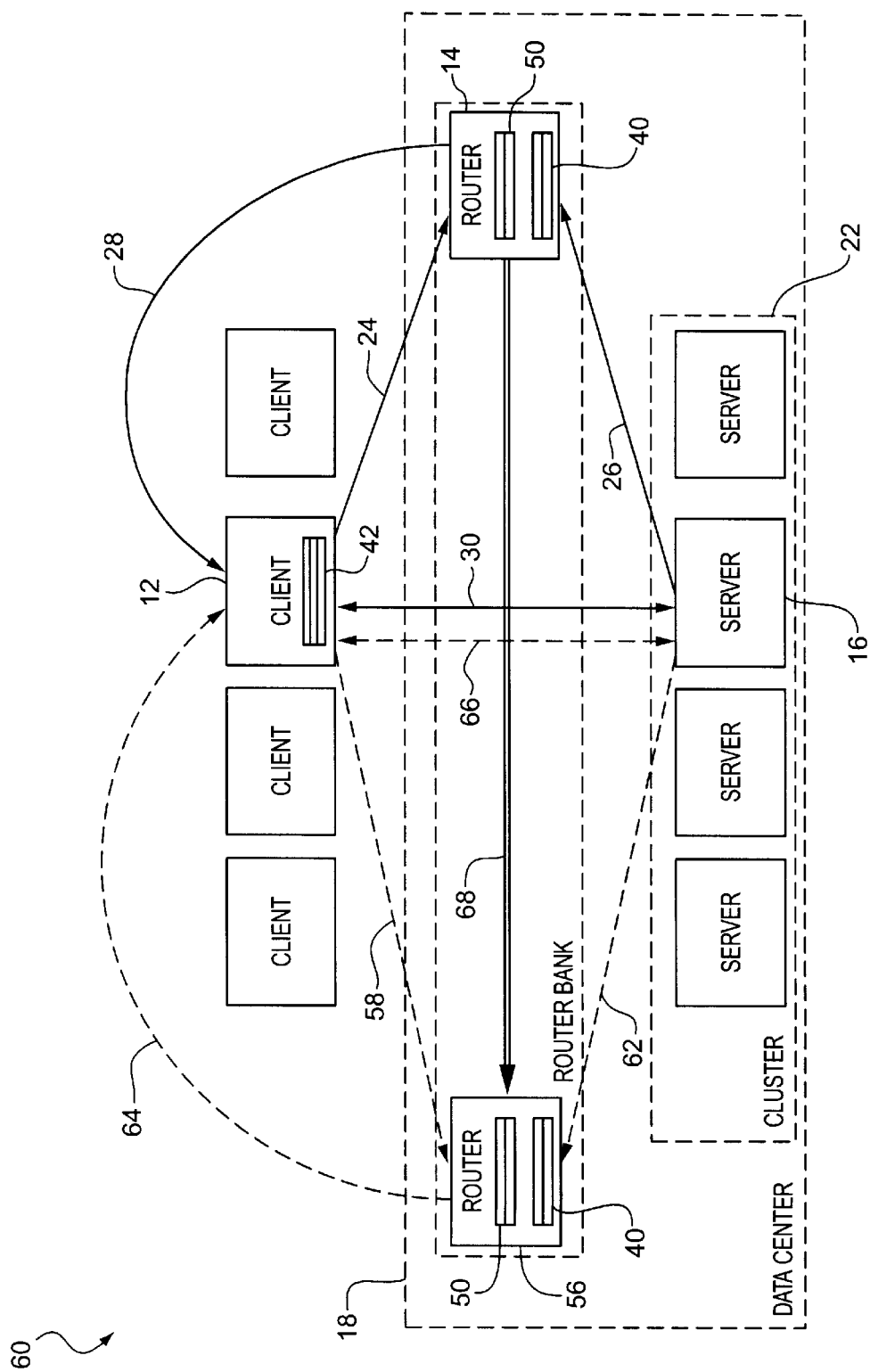
FIG. 3 is a block diagram illustrating a network, according to one exemplary embodiment of the present invention, which uses the sticky IP and router synching to reestablish connections between a client and a server.

FIG. 3 illustrates a network 60, according to one embodiment of the present invention, that implements sticky IP and router synchronizing. In the network 60, no matter which router a client communicates with the client will be directed to the same server each time, assuming that the server is active.

The client 12 needs to establish a communication link with a server within the data center 18. The client 12 selects an IP address from the router IP address table 42 and sends the message 24 to the router 14. The router 14 realizes that it cannot handle the request and that it has to redirect the client's communication to a server. The router 14 looks up the client's address in the sticky IP cache table 50 to see if the client 12 has communicated with the data center 18 before. The router 14 does not find an entry for the client 12 so it needs to consult its routing table 40 to see which server is slated to receive the next communication. The server 16 is slated to receive the next client communication and is active, so the router 14 redirects communication from the client 12 to the server 16 with the redirect communication 28. After the client 12 is redirected, the router 14 updates its sticky IP cache table 50 and sends a multicast message 68 to inform all other routers in the data center 18 that the client 12 is communicating with the server 16. The router 56 receives the multicast message 68 and updates its sticky IP cache table 50 creating a new entry in the sticky IP cache table 50 with the client 12 address paired with the server 16 address. The client 12 continues communication with the server 16 for a period of time.

Communication between the two network devices will continue until one of two things happen. First, a fixed period of time can elapse. The client 12 is configured to continue communication with the server 16 for a maximum period of time. After that period of time has elapsed the client 12 must establish a new communication link by communicating with a router in the bank of routers 20. Secondly, a hardware or software error could occur disrupting communication between the two network devices. The software or hardware error could be anything from the server 16 losing power to the physical network connection being disconnected. The manifestation of this error is that the client 12 does not receive a return message from the server 16. If the client 12 does not receive a message from the server 16 the client 12 will attempt to reconnect through the bank of routers 20.

Communication between the client 12 and the server 16 will eventually end and the client 12 will then have to reestablish communication with the data center 18. The client 12 looks to its list of router addresses stored within the router IP address table 42 and contacts the next router on the list. This time the client communicates, merely for example, with the router 56. The router 56 realizes that it cannot handle the request and that it has to redirect communication from the client 12 to a server. The sticky IP cache table 50 on the router 56 was updated by the multicast message 68 from the router 14 so the router 56 knows to redirect the communication from the client 12 to the server 16. The router 56 looks to its routing table 40 and ascertains that the server 16 is accepting communications. The router 56 redirects the client 12 to the server 16 with a redirect communication 64 causing the client 12 to begin communicating with the server 16 directly. The communication between the client 12 and the server 16 will continue until the communication link times out or the server can no longer handle the client's requests for information.

Figure 4:
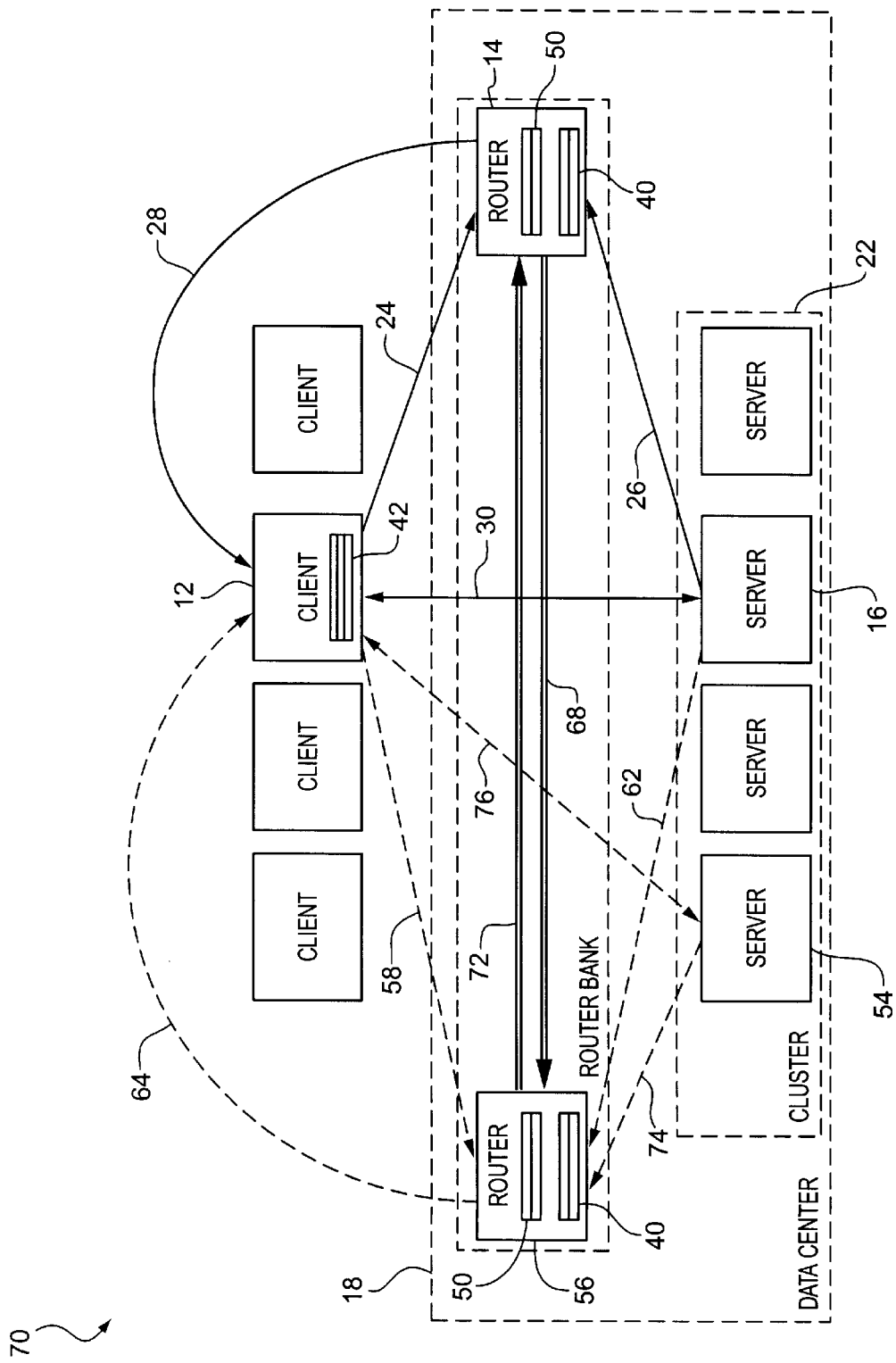
FIG. 4 is a block diagram illustrating a network, according to one exemplary embodiment of the present invention, which uses the sticky IP and router synching but is unable to reestablish a connection between a client and a server.

In some cases communication with the same server within the cluster 22 is not possible on a reconnect. This situation is shown in FIG. 4. The client 12 needs to establish a connection with the data center 18 to acquire needed data. The client 12 selects an IP address from the router IP address table 42 and sends the message 24 to the router 14. The router 14 realizes that it cannot handle the request and that it has to redirect communication from the client 12 to a server. The router 14 looks up the client's address in the sticky IP cache table 50 to see if the client 12 has communicated with the data center 18 before. The router 14 does not find an entry for the client 12 so it needs to consult its routing table 40 to see which server is slated to receive the next communication. The server 16 is, for example, next in the routing table 40 so the router redirects communication from the client 12 to the server 16 with the redirect communication 28. After the client 12 is redirected, the router 14 updates its sticky IP cache table 50 and transmits the multicast message 68 to inform the other routers in the data center 18 that the client 12 is communicating with the server 16. The router 56 receives the multicast message 68 and updates its sticky IP cache table 50 on the router 56 creating a new entry in the sticky IP cache table 50 with the address of the client 12 paired with the address of the server 16. Eventually the server 16, merely for example, may go down and communication will thus be severed between the client 12 and the server 16. The client 12 must in this situation reestablish communication with the data center 18.

The client 12 begins establishing communication with the data center 18 by sending a message 58 to the next router indicated within the router IP address table 42, for example, the router 56. The router 56 realizes that it cannot handle the request and that it has to redirect the client's communication to a server. The router 56 checks the sticky IP cache table 50 to see if the client 12 is listed. An entry is found because the table was updated by the multicast message 68. The router 56 checks to see if the server 16 is accepting communications by looking at the routing table 40. The server 16 will be marked as disabled in the routing table 40 because the machine has gone down. The router 56 must choose a new server from the cluster 22. The router 56 looks at the routing table 40 and, for example, sees that the server 54 is slated to receive the next communication and it is not disabled. The router 56 redirects the client 12 to communicate with the server 54. Then the router 56 updates the sticky IP cache table 50 with the new server information and multicasts the update to the rest of the routers in the data center with a multicast message 72. The rest of the routers in the data center 18 pick up the multicast message 72 and overwrite the old server address in the entry of the client 12 with the address of the server 54. This action does not create a new table entry. It simply overwrites the server address in the old table entry.

Figure 5A:
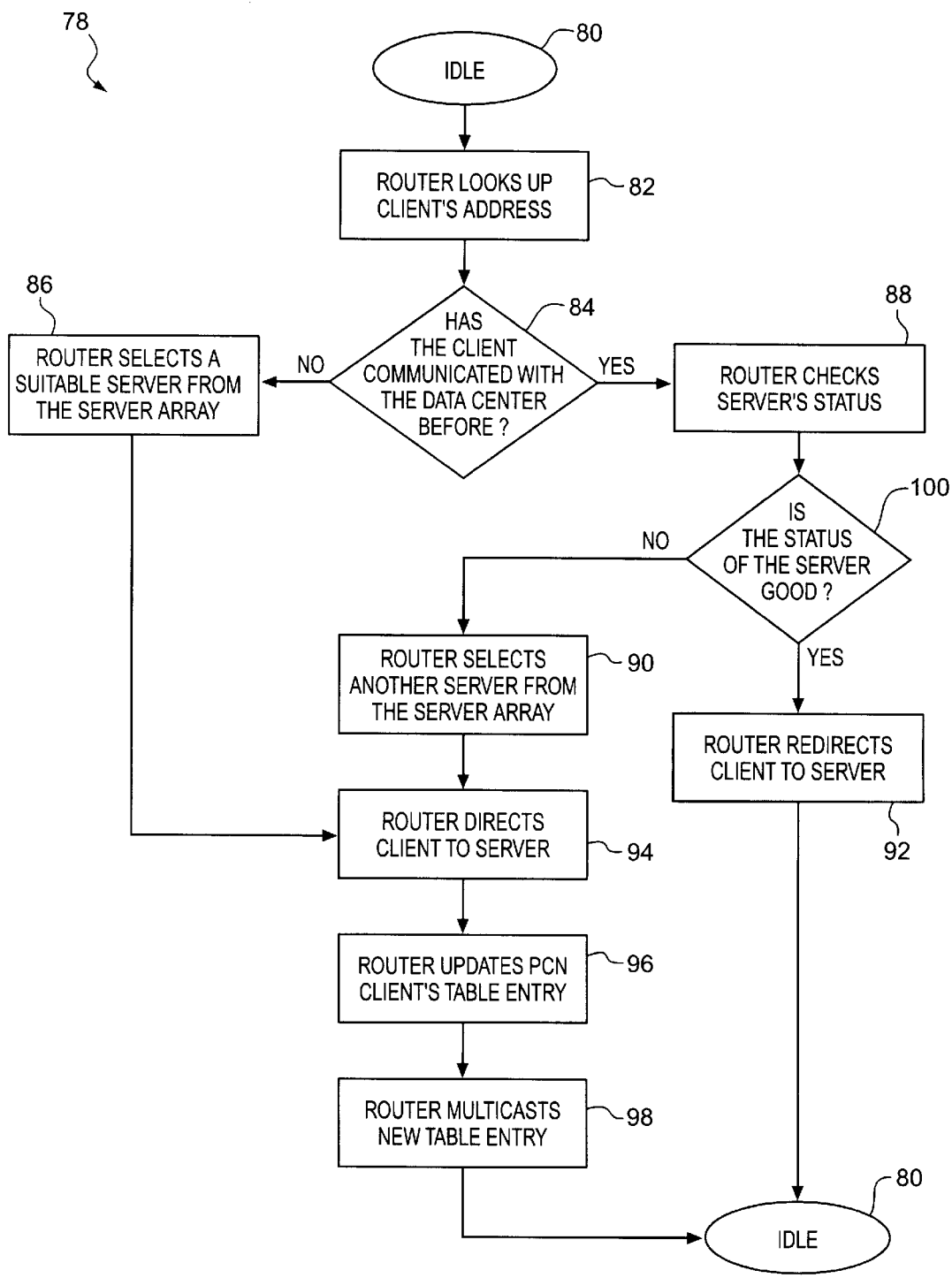
FIG. 5A is a flowchart illustrating a methodology, according to one exemplary embodiment of the present invention, used by a router when it receives a message from a client.

FIG. 5A is a flow chart illustrating a method 78, according to one embodiment of the present invention, that a router, such as the router 14, performs when it receives a message from a client. The router starts off in an idle state 80 waiting for a message from another network device. When the router receives a message it decodes the message type. If the message is a data request from a client, then the router transitions to a process step 82.

At the process step 82, the router decodes the client's address and looks it up in the sticky IP cache table 50. If the address is not in the sticky IP cache table 50, then the data center 18 has not communicated with that particular client previously and at a decision block 84 the router will transition to a process step 86. If the address is in the routing table then the router will transition to a process step 88.

If the router does not find the address, it must select the next server from the routing table 40 at the process step 86. The server selected in the process step 86 must also be accepting new communications. The router looks up the next server slated to receive a client request and checks that the server is active. After the router finds an acceptable server, the router redirects the client to the selected server at a process step 94. The router completes the method 78 by updating the client's entry in the sticky IP cache table 50 with the selected server's address at a process step 96, multicasting the table entry to the rest of the routers in the data center 18 at a process step 98, and reentering the idle state 80.

If the router finds the client's address in the router table at the process step 82 then the router transitions to the process step 88 from the decision block 84. The client should attempt to communicate with the same server it has previously if at all possible. Communicating with the same server repeatedly will conserve time and resources by not caching information unnecessarily. The router checks the status of the server that is referenced in the sticky IP cache table 50 at the process step 88, and determines whether the server is accepting new communications. At a decision block 100 the router interprets this information and if the server's status is good then the router advances to a process step 92. In the process step 92 the router redirects the client to the server listed in the routing table 40, and then reenters the idle state 80.

If the server is unresponsive or the status of the server is bad then the router will proceed from the decision block 100 to a process step 90. During the process step 90 the router selects the next server slated to receive a client request by the routing table 40 and makes certain the server is active. After the server is selected the router redirects the client to the selected server at the process step 94. The router completes the method by updating the client's entry in the sticky IP cache table 50 with the selected server's address at the process step 96, multicasting the table entry to the rest of the routers in the data center 18 at the process step 98, and finally reentering the idle state 80.

A router can also receive a message from another router. FIG. 5B is a flowchart illustrating a method 102, according to one embodiment of the present invention, performed by a router when it receives a multicast message from a router in the data center 18. The router rests in the idle state 80 until a message is sent to it. If the message is a multicast message from a router in the data center it proceeds to a decision block 104. The router looks up the client's address in the sticky IP cache table 50 while in the decision block 104, much as it does when it receives a message from a client during the process step 82 shown in FIG. 5A. However, the address of the client is extracted from the data portion of the multicast message, not the return address of the message as in the process step 82. If the address is found in the table the decision block 104 causes the router to advance to a process step 106. During the process step 106 the router extracts the server address from the multi-casted message and records the new address in the table. After the address is recorded the router returns to the idle state 80. If the address is not found in the table the decision block 104 causes the router to advance to a process step 108. Once there, the router creates a new entry in the sticky IP cache table 50 containing the client and server addresses. Finally, the router transitions to the idle state 80 to await the next message.

FIG. 6 shows an exemplary implementation of the sticky IP cache table 50. The sticky IP cache table 50 contains client and server address pairs, and uses these pairs to redirect clients to the correct server.

A first column 110 of the sticky IP cache table 50 contains client addresses, and a second column 112 of the sticky IP cache table 50 contains server addresses. When a client contacts a router, the router looks up the client's address in the sticky IP cache table 50 using the first column 110 to see if the data center 18 has previously redirected that particular client. If the address is found, the sticky IP cache table 50 gives the router easy access to the address of the last server the client communicated with, which is recorded in the second column 112. The client is redirected to that server unless the server is marked as disabled in a column 118 of the routing table 40 (shown in FIG. 7). If the client address is not in the sticky IP cache table 50 or the server indicated in the sticky IP cache table 50 is disabled, the router will redirect the client to the next server slated to receive a client redirection by the routing table 40.

Updating the sticky IP cache table 50 happens under at least two sets of conditions. The sticky IP cache table 50 is updated if a new client accesses the data center 18 or if a client cannot be redirected to the same server it has been redirected to previously. If the communication from the client to the router is from a new client then a new entry in the sticky IP cache table 50 must be created. This new entry is written into the sticky IP cache table 50 resident on the router that received the communication from the new client and then a multicast message is sent to each router in the data center 18 including itself with the new information.

If the client cannot be redirected to the same server that it has been redirected to in the past the existing entry in the sticky IP cache table 50 has to be updated. The old server address is overwritten by the new server address in the table resident on the router that received the communication. Then a multicast message is sent to each router in the data center 18 including itself with the updated information.

FIG. 7 shows the routing table 40 which contains the information necessary for the router to choose a server for the client. The routing table 40 is created on each router by "heartbeat" messages sent by each of the servers in the data center 18 to each router in the data center 18. When a server is active it sends messages on a regular basis to the routers in the data center 18 imparting information about the present state of the server.

When the router receives a heartbeat message from a server the router scans a column 114 of the routing table 40 for an entry containing the server's address. If one is found the fields of that entry are updated. If one is not found a new entry in the table is created. The heartbeat message contains data relating to the server's present state. The data sent in the message is extracted by the router and stored in the routing table 40.

Most of the data recorded in the routing table 40 is created by the server that sends the message or the router that receives the message. The column 114 of the routing table contains the addresses of the servers that have sent heartbeat messages to the router. The addresses in the column 114 in combination with the port numbers stored in a column 116 inform the clients how to communicate with the selected server. The CPU rating is stored in a column 120 and denotes the processing power of the server. The load on the server is stored in a column 122. The load is a number between zero and one hundred, where a zero load means the server is not servicing any requests and a one hundred load means the server is fully loaded and all resources have been used. A column 124 stores the time the last "heartbeat message" was received for that entry in the table. The column 124 is the only data that is generated by the router and may be used when calculating when the server should be marked in active or disabled because the router has not received a heartbeat from it within a predetermined threshold period (time-out period).

The column 118 stores the current priority that the server is assigned. For example, a server may be indicated as having a "High", "Normal" or "Low" priority, or may be indicated as being inactive or "Disabled", in the column 118. The current priority of a server is a user-defined variable which dictates how much traffic is redirected towards that server. The router will intercede and mark the server as inactive or disabled, by placing an appropriate indication in the column 118, if a server has not sent a heartbeat message to the router within the time-out period. If a server is marked as inactive or disabled, no client requests will be redirected to it.

The routing table 40 is used when a request arrives at a router from a client. The router uses the routing table 40 to schedule the order in which requests are redirected to particular servers. The router starts at the top of the routing table 40 and progresses through the entries in an orderly fashion. If a server is marked inactive in the column 118, the router will not redirect requests to it and the router will go to the next entry in the routing table 40. If the current entry in the routing table 40 has a priority value of high, the next three requests received by the router will be redirected to it. If it has normal priority, the next two requests will be redirected to it. And, if it has low priority, only one request will be sent to it. When the router gets to the last entry in the routing table 40, it loops back to the beginning of the routing table 40. In the exemplary implementation, the router only takes into account what the current priority, stored in the column 118, of the server is when it redirects requests to the server. Other factors such as the current load stored in the column 122 or the content groups cached by the server could also be taken into account when redirecting the client.

Turning now to specific communications, FIG. 8A illustrates the message 24 sent from the client 12 (e.g., a PCN Client) to the router 14 (e.g., a PointRouter). The client 12 initially downloads a list of router IP addresses via version control or as part of the software and stores them in the router IP address table 42. The client 12 cycles through this list when it contacts the data center 18. The client 12 initiates contact with the data center 18 by sending the message 24 to one of the routers in the router IP address table 42.

The message 24 sent by the client 12 is a data request. The router 14 looks at the message 24 and responds by redirecting communication from the client 12 to a suitable server. An exemplary message format 170 for the message 24 is shown in FIG. 8B. This message is a request for data from the client 12 which needs to be redirected to a server. The router that receives the message 24 parses the relevant information out of the communication and redirects the client to a suitable server.

The message format 170, depicted in FIG. 8B, contains all the information that a server needs to fulfill a request for data. The message format 170 begins with the word GET. GET tells the router or the server what the request method is going to be. This allows the router to know that it should redirect communication to the server, and tells the server that it is a data request. This is followed by FIDO-1, which is the application id. The NumItems field, following FIDO-1, tells the server how many articles the client wishes to have downloaded. An associated field is the NumRef field which tells the server how many attachments each article possesses. The next seven numbers, here 1310993, are a "content group identifier" and represent a content group that the client is looking to download. The "1" that follows the content group identifier is a tag that tells the server what the last article the client downloaded from the category was so that the server does not resend that piece of data. Next the message conveys the search argument. This allows a user to further define the content it desires. Here the search argument is usa::stnrx. Finally, the message conveys the HTTP protocol version.

Figure 9:
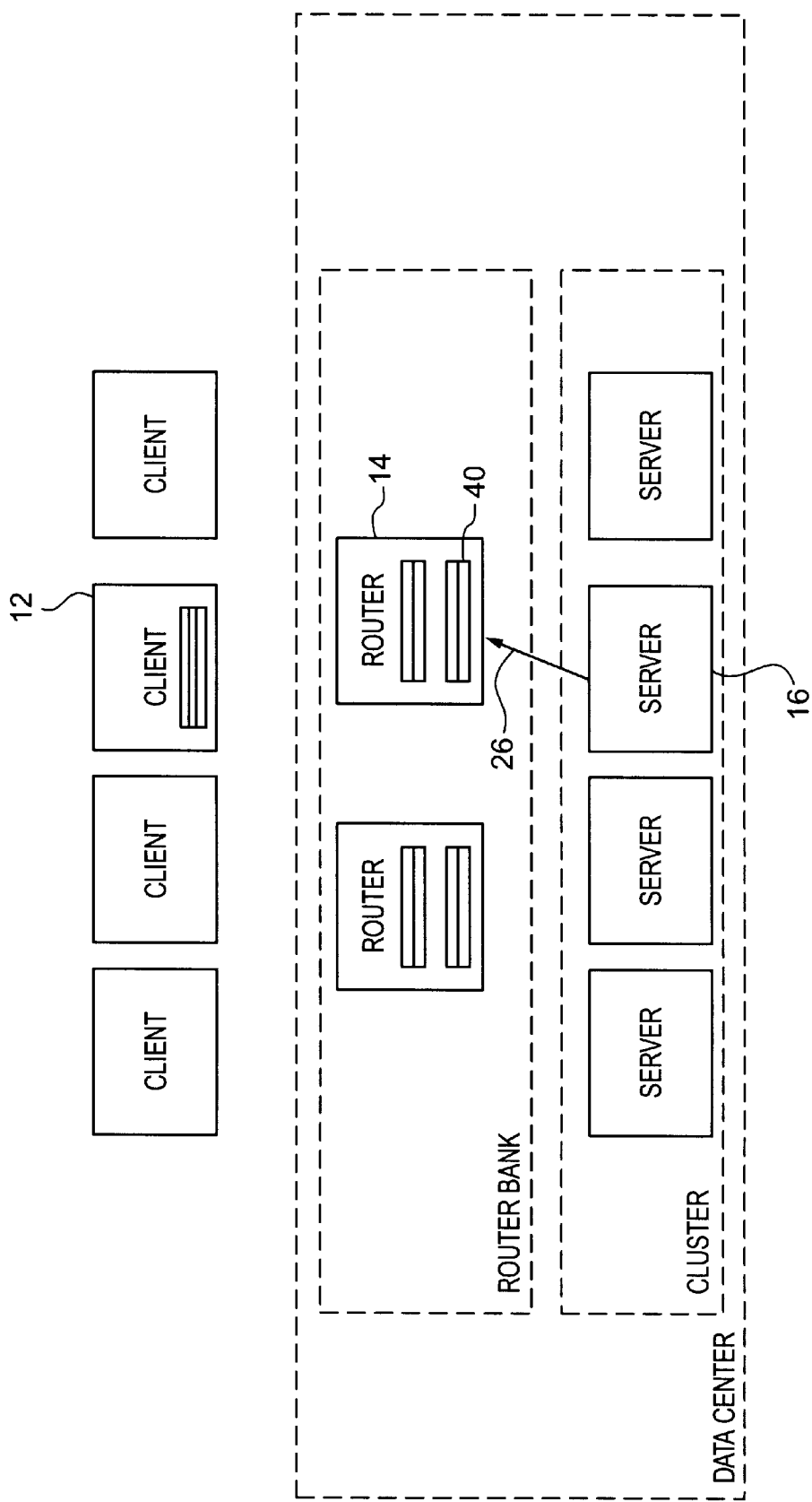
FIG. 9 shows a block diagram of a network, according to one exemplary embodiment of the present invention, illustrating a heartbeat message sent from a server to a router which is used to build a routing table.

FIG. 9 illustrates a heartbeat communication 26 transmitted from the server 16 to the router 14. The servers in the data center 18 relay information about themselves to the routers in the data center 18 via heartbeat communications transmitted in regular intervals. The information contained within the heartbeat communications is parsed out and deposited in the routing table 40, shown in FIG. 7. The routing table 40 is used by a router when it needs to find a server to redirect a client's communication. These heartbeat communications are multicasted from each server in the data center 18 to each router in the data center 18.

Figure 10A:
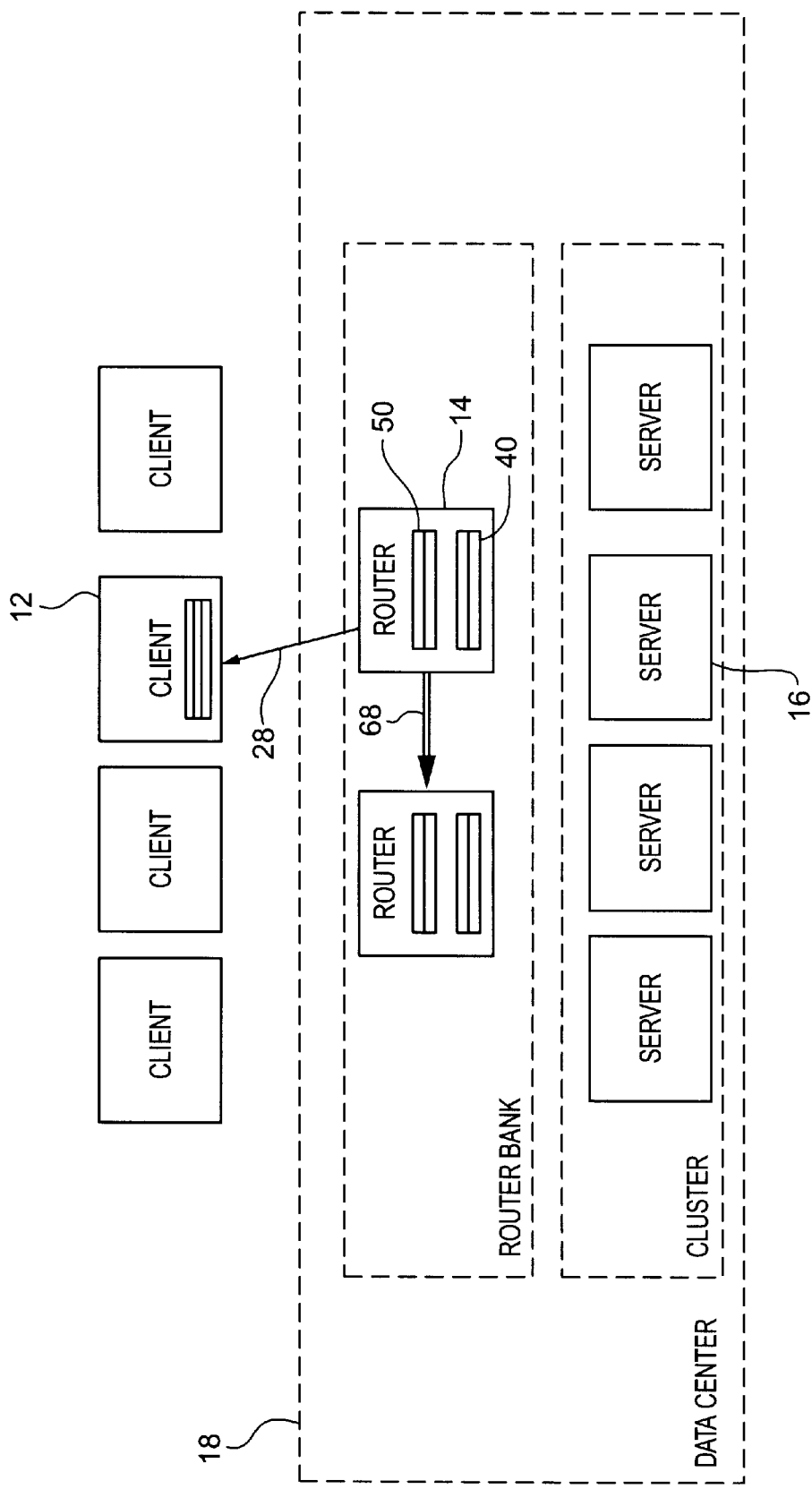
FIG. 10A shows a block diagram of a network, according to one exemplary embodiment of the present invention, illustrating a redirection message from a router and a multicast message publishing the redirection to other routers in a data center.

FIG. 10A illustrates the redirect communication 28 sent to the client 12 and the multicast message 68 publicizing the client's assignment.

The router 14 sends the redirect communication 28 back to the client 12 to inform it where new communications should be temporarily directed. A format 176 for this communication is shown in FIG. 10B. The communication could contain a status field telling the client that the router has "Temporarily moved" status. If the communication relates this information a new IP address and port identifier must also be included so the client 12 knows where to send future data requests. After the client receives this communication it will begin to direct its communication directly to the server specified in the redirection message. The status field may also return a "No Servers Available" status. If it does, the client 12 has to wait and retry the data center 18 at a later time. All the information depicted in FIG. 10B is not necessarily needed, and is provided for illustrative purposes only.

The router 14 sends the multicast message 68 to all of the routers in the data center 18, including itself, immediately after the message 24 is sent. Sending the multicast message to itself insures coherency between the sticky IP cache tables. The multicast message 68 informs the routers in the data center 18 of the assignment if an assignment is made. This communication can be realized in many ways. The plurality of routers could share a common table or each router could receive a dedicated message. The important quality of this communication is that the sticky IP cache tables are in synchronization with each other.

In the exemplary implementation, the data center 18 uses Tibco Rendezvous middleware, developed by Tibco Inc. of Palo Alto, Calif., to multicast the necessary information to the routers. The Tibco Rendezvous software is also used for communication between the servers. Upon startup, each router will connect to various multicast points (MCpoints). Each MCpoint is analogous to a Transmission Control Protocol (TCP) port. A multicast message is written into a MCpoint when the multicast is sent. Only multicast messages are written to the MCpoint. The routers receive these messages and take appropriate action based on the message received. By having a dedicated port for receiving multicast messages the information pertaining to the sticky IP cache table is promulgated quickly and coherency is maintained.

Figure 11:
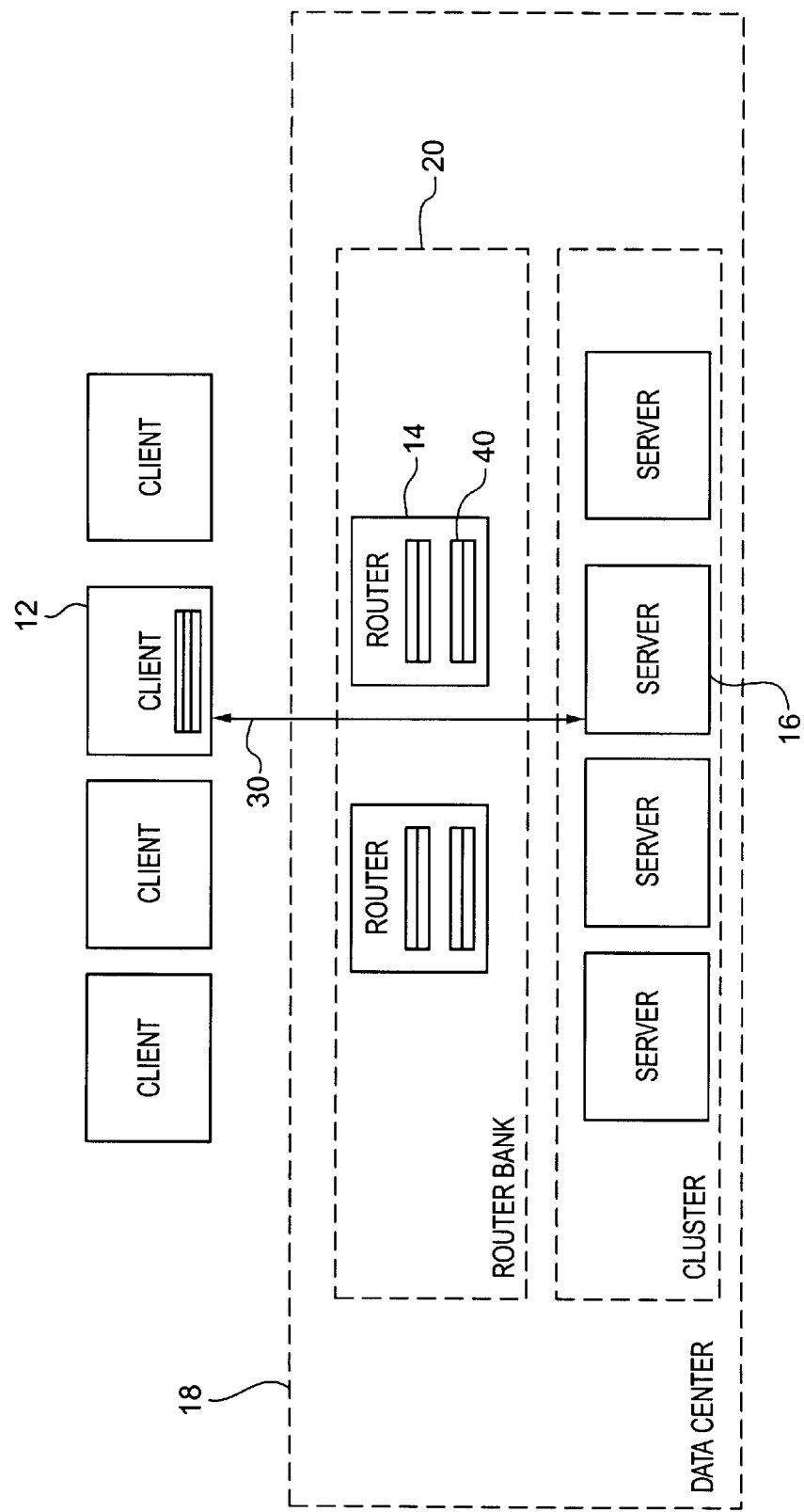
FIG. 11 shows a block diagram of a network, according to one exemplary embodiment of the present invention, illustrating the communication between a client and a server.

FIG. 11 shows a communication 30 between the client 12 and the server 16. After the client 12 is redirected to communicate directly with the server 16 the communication 30 commences between the client 12 and the server 16 bypassing the router 14 entirely. The message, depicted in FIG. 8B, is a request for data from the server 16 and is described above. The message requests certain information from the server 16 specifying the content group and amount of information it needs. The message is addressed using information from the routing table 40 including the server address and the port number of the server 16 from the routing table 40. The server 16 responds with the information it has in its main memory or it looks to a secondary server for the information.

Communication between the two network devices will continue like this until one of two things happen. First, a fixed period of time can elapse. The client 12 is configured to continue communication with the server 16 for a maximum period of time. After that period of time has elapsed the client 12 must establish a new communication link by communicating with a router in the bank of routers 20. Secondly, a hardware or software error could occur disrupting communication between the two network devices. The software or hardware error could be anything from the server 16 losing power to the physical network connection being disconnected. The manifestation of this error is that the client 12 does not receive a return message from the server 16. If the client 12 does not receive a message from the server 16 the client 12 will attempt to reconnect through the bank of routers 20.

Figure 12:
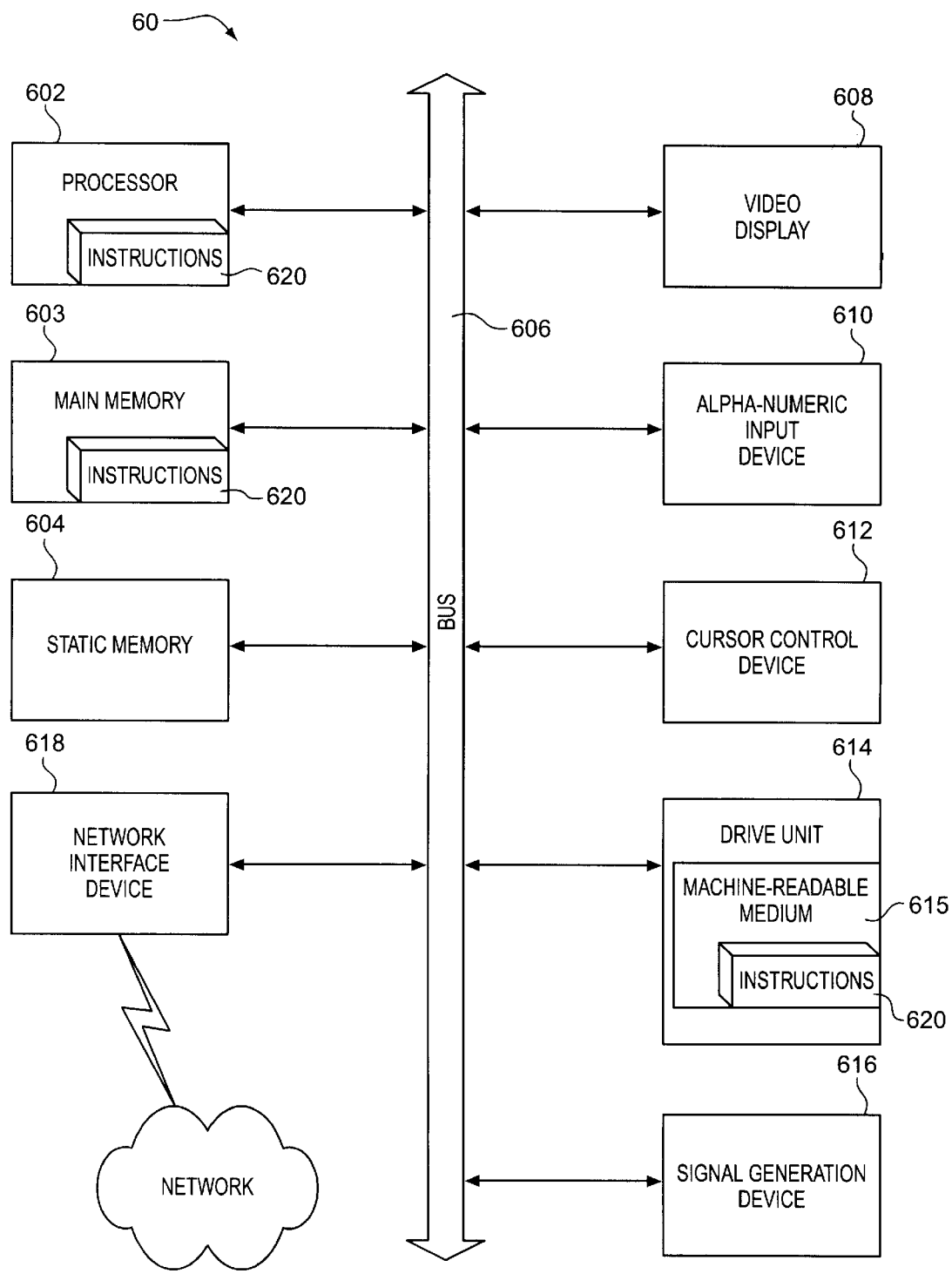
FIG. 12 is a block diagram of a computer system, according to one exemplary embodiment of the present invention.

FIG. 12 is a diagrammatic representation of a machine in the form of a computer system 60, that may in turn operate as a client, router or server for the purposes of implementing the present invention. Machine-readable instructions, in the form of computer software, for performing any of the methodologies discussed above may also be executed within the computer system 60. The computer system 60 includes a processor 602, a main memory 603 and a static memory 604, each of which is coupled to a bus 606. The computer system 60 further includes a video display units 608 (e.g., a liquid crystal display (LCD) or a cathode ray tube (CRT)). The computer system 60 also includes an alpha-numeric input device 610 (e.g., a keyboard), a cursor control device 612 (e.g., a mouse), a disk drive unit 614, a signal generation device 616 (e.g., a speaker) and a network interface device 618. The disk drive unit 614 includes a machine-readable medium 615 on which instructions 620 for execution by the processor 602 are stored. The instructions 620 are also shown to reside, completely or at least partially, within the main memory 603 and/or within the processor 602. The instructions 620 may further be transmitted or received over a network by the network interface device 618. For the purposes of the present specification, the term "machine-readable medium" shall be taken to include any medium that is capable of storing or encoding a sequence of instructions for execution by a machine, and that cause the machine to perform the methodologies of the present invention. The term "machine-readable medium" shall be taken to include, but not be limited to, solid-state memories, optical and magnetic disks, and carrier wave signals.

Figure 13:
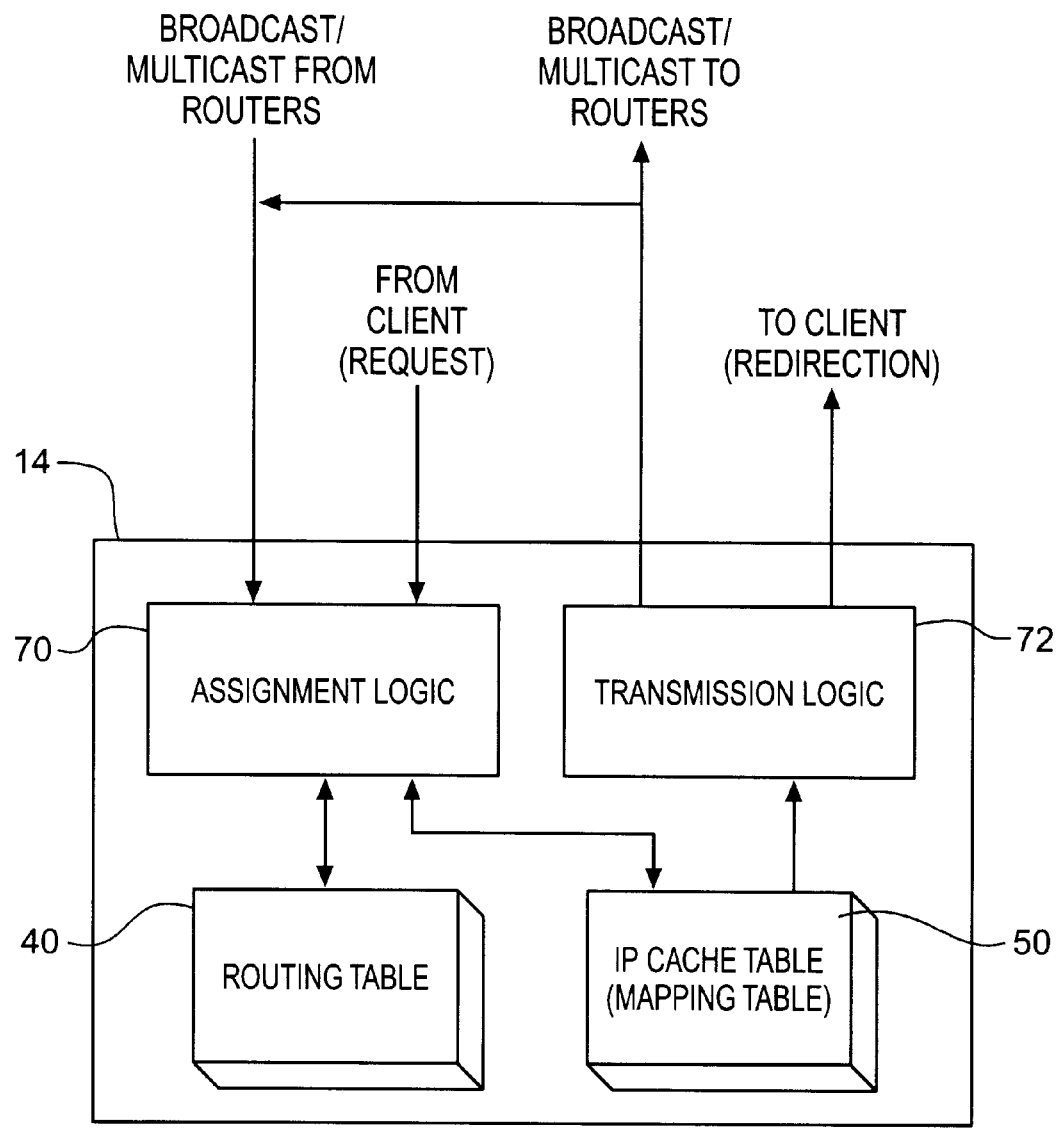
FIG. 13 is a block diagram showing logic and tables, according to an exemplary embodiment of the present invention, resident on a router.

FIG. 13 is a block diagram illustrating logic and tables, according to an exemplary embodiment of the present invention, that may be resident on a router 14. Specifically, the router 14 is shown to host the routing table 40 and the sticky IP cache table 50, as well as assignment logic 70 and transmission logic 72. The assignment logic 70 and the transmission logic 72 may be implemented in hardware, software or any combination of hardware and software. The assignment logic 70 is responsible for assigning a client to a server 16, responsive to a request received from the client, and recording this assignment in the sticky IP cache table 50. To perform this assignment, the assignment logic 70 firstly determines whether a record including an IP address for the requesting client exists within the sticky IP cache table 50. If so, this indicates that the requesting client has previously been redirected to a particular server, whose address will also be stored within the table 50. Accordingly, the assignment logic 70 will then assign the requesting client to the server indicated in the record in the table 50, and a redirection message (or redirect communication 28) communicating this assignment to the client is propagated to the client from the transmission logic 72.

Should no record including the IP address of the requesting client exists within the sticky IP cache table 50, the assignment logic 70 then consults the routing table 40, to determine the server that should be assigned to the requesting client, as described above. The client-server pairing information, as determined according to the routing table 40, is then communicated to the assignment logic 70, which records this pairing information in the sticky IP cache table 50, whereafter a redirection message is again propagated to the client.

The transmission logic 72 is also shown to broadcast or multi-cast a synchronization message including information concerning the client-server pairing to other routers in the manner described above. The synchronization message is also shown to be received at the assignment logic 70 hosted on the same router, so that synchronization is achieved even when race conditions occur. The assignment logic 70 also receives synchronization messages from other routers, indicating information concerning other client-server pairings established by such other routers. In response to the receipt of these synchronization messages (as well as self-originated synchronization messages), the assignment logic 70 updates the sticky IP cache table 50 to achieve the synchronization taught by the present invention.

Thus, a method of reestablishing connections between a particular client and a particular server by multiple routers has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of establishing a communication link between a client and a first server of a plurality of servers, the method including the steps of:
   assigning the client to the first server of a plurality of servers in response to a transmission received at a first router of a plurality of routers from the client; and
   transmitting information from the first router to a second router of the plurality of routers, the information indicating the assignment of the client to the first server of the plurality of servers.

2. The method of claim 1 wherein the assignment step includes the step of recording the information that indicates the assignment of the client to the first server in a mapping table.

3. The method of claim 2 wherein the mapping table maps an address of the client to an address of the first server.

4. The method of claim 3 wherein the assignment step includes a step of determining the address of the first server from an entry in the mapping table if the address of the client appears in the mapping table.

5. The method of claim 3 wherein the assignment step includes a step of determining the address of the first server utilizing a routing table if the address of the client does not appear in the mapping table.

6. The method of claim 5 including a step of constructing the routing table from communications received from any one of the plurality of servers.

7. The method of claim 2 including a step of making the mapping table publicly accessible to each of the plurality of routers.

8. The method of claim 1 wherein the step of transmitting the information indicating the assignment of the client to the first server comprises a step of multicasting the information to each of the plurality of routers.

9. The method of claim 1 wherein the step of transmitting the information indicating the assignment of the client to the first server comprises a step of broadcasting the information.

10. The method of claim 1 including a step of transmitting a message to the client indicating the assignment of the client to the first server.

11. The method of claim 1 including a step of ascertaining whether the first server is accepting communications prior to the step of assigning.

12. The method of claim 11 including a step of assigning the client to a second server if the first server is not accepting communications.

13. The method of claim 11 including a step of maintaining a status indication of whether each of the plurality of servers is accepting communications in a routing table.

14. The method of claim 13 including a step of modifying the status indication of the first server from receiving communications to not receiving communications if the first server does not update its entry in the routing table within a predetermined period of time.

15. The method of claim 1 wherein the client communicates directly with the first server until communication between the client and the first server fails.

16. The method of claim 1 wherein the client communicates directly with the first server for a predetermined period of time.

17. A method for routing network messages comprising the steps of:
   a router receiving a message from a client;
   the router looking up an address of the client in a table within the router;
   the router not finding the address of the client in the table;
   the router finding a server that is suitable to receive the message;
   the router recording an address of the server and the address of the client in the table;
   the router sending a message to the client redirecting communication from the client directly to the server; and
   the router communicating the address of the client and the address of the server to a plurality of other routers.

18. A router for establishing a communication link between a client and a first server of a plurality of servers, the router including:

assignment logic to assign the client to the first server of the plurality of servers in response to a transmission received answer the router from the client; and transmission logic to transmit information to a further router, the information indicating the assignment of the client to the first server of the plurality of servers.

19. The router of claim 18 wherein the assignment logic records the information indicating the assignment of the client to the first server in a mapping table.

20. The router of claim 19 wherein the mapping table maps an address of the client to an address of the first server.

21. The router of claim 20 wherein the assignment logic determines the address of the first server from an entry in the mapping table if the address of the client is included within the mapping table.

22. The router of claim 20 wherein the assignment logic determines the address of the first server utilizing a routing table if the address of the client is not included within the mapping table.

23. The router of claim 22 wherein the assignment logic constructs the routing table utilizing communications received from any one of the plurality of servers.

24. The router of claim 22 wherein the assignment logic constructs the mapping table utilizing communications received from any one of the plurality of routers.

25. The router of claim 18 wherein the transmission logic transmits the information indicating the assignment of the client to the first server as a multi-cast message to each of the plurality of routers.

26. The router of claim 18 wherein the transmission logic transmits the information indicating the assignment of the client to the first server as a broadcast message to each of the plurality of routers.

27. The router of claim 18 wherein the transmission logic transmits a message to the client indicating the assignment of the client to the first server.

28. The router of claim 18 wherein the assignment logic ascertained whether the first server is accepting communications prior to assigning the client to the first server.

29. The router of claim 28 wherein the assignment logic assigns the client to a second server of the plurality of servers if the first server is not accepting communications.

30. The router of claim 28 wherein the assignment logic maintains a status indication of whether each of the plurality of servers is accepting communications in a routing table.

31. The router of claim 30 wherein the assignment logic modifies a status indication of the first server to indicating the first server as not accepting communications if the first server does not update an associated entry within the routing table within a predetermined period of time.

32. Apparatus for establishing a communication link between a client and a first server of a plurality of servers, the apparatus including:

assignment means for assigning the client to the first server of the plurality of servers in response to a transmission received at a first router of a plurality of routers from the client; and transmission means for transmitting information to a second router of the plurality of routers, the information indicating the assignment of the client to the first server of the plurality of servers.

33. A machine readable medium storing a sequence of instructions that, when executed by a machine, causes the machine to perform the steps of:

assigning the client to the first server of a plurality of servers in response to a transmission received at a first router of a plurality of routers from the client; and transmitting information indicating the assignment of the client to a second router of the plurality of routers.

34. A method comprising:

a router receiving a request from a client;

the router causing the client to connect to a server suitable for responding to the request by redirecting the client to the server;

the router storing information regarding the connection between the client and the server by updating a sticky Internet Protocol (IP) cache table; and the router maintaining the coherency of sticky IP cache tables of one or more other routers by informing the one or more other routers of the connection between the client and the server via a multicast message directed to the one or more other routers.

\* \* \* \* \*